(12) United States Patent
Wasserfuhr et al.

(10) Patent No.: US 12,109,847 B2
(45) Date of Patent: Oct. 8, 2024

(54) HUB COVERING FOR A TYRE FILLING DEVICE OF A VEHICLE

(71) Applicant: BPW Bergische Achsen KG, Wiehl (DE)

(72) Inventors: Wilfried Wasserfuhr, Marienheide (DE); Andreas Timm, Wiehl (DE)

(73) Assignee: BPW Bergische Achsen KG, Wiehl (DE)

( * ) Notice: Subject to any disclaimer, the term of this patent is extended or adjusted under 35 U.S.C. 154(b) by 405 days.

(21) Appl. No.: 17/607,579

(22) PCT Filed: Apr. 20, 2020

(86) PCT No.: PCT/DE2020/100322
§ 371 (c)(1),
(2) Date: Oct. 29, 2021

(87) PCT Pub. No.: WO2020/224703
PCT Pub. Date: Nov. 12, 2020

(65) Prior Publication Data
US 2022/0379668 A1 Dec. 1, 2022

(30) Foreign Application Priority Data
May 3, 2019 (DE) ................. 10 2019 111 422.5

(51) Int. Cl.
*B60C 23/00* (2006.01)
(52) U.S. Cl.
CPC .. *B60C 23/00327* (2020.05); *B60C 23/00363* (2020.05)

(58) Field of Classification Search
CPC ............ B60B 7/0013; B60C 23/00336; B60C 23/00363; B60C 23/00327
USPC ........................................................ 301/184.4
See application file for complete search history.

(56) References Cited

U.S. PATENT DOCUMENTS

| 2,156,841 | A | * | 5/1939 | Davis | ................ | B60C 23/00363 |
| | | | | | | 152/417 |
| 3,944,285 | A | * | 3/1976 | Vincent | ..................... | B60B 3/14 |
| | | | | | | 403/258 |
| RE32,903 | E | * | 4/1989 | Braungart | ................. | B60B 7/14 |
| | | | | | | 301/37.38 |
| 6,131,631 | A | * | 10/2000 | Bradley | ............ | B60C 23/00336 |
| | | | | | | 152/417 |

(Continued)

FOREIGN PATENT DOCUMENTS

EP    1 265 761    9/2001

*Primary Examiner* — Kip T Kotter
*Assistant Examiner* — Eva L Comino
(74) *Attorney, Agent, or Firm* — Gudrun E. Huckett

(57) ABSTRACT

The invention relates to a hub covering (2) for a tyre filling device of a vehicle for covering a wheel hub (1) of the vehicle, wherein an air supply which is coupled to a steering knuckle (21) arranged inside the wheel hub (1) is connected to an air volume in a tyre of a vehicle wheel at least indirectly via a rotary connection (3) arranged on the hub covering (2), wherein the rotary connection (3) comprises an adapter (4), which is arranged in an axially secured and rotatable manner on the hub covering (4), and receives a rotary transmitter (5) for producing a compressed air connection to the tyre of the vehicle wheel. The invention further relates to a tyre filling device and to an adapter (4) for such a hub covering (2).

15 Claims, 2 Drawing Sheets

(56) References Cited

U.S. PATENT DOCUMENTS

| | | | | |
|---|---|---|---|---|
| 2005/0194079 A1* | 9/2005 | Hennig | ............ | B60C 23/00363 |
| | | | | 152/417 |
| 2008/0061623 A1* | 3/2008 | Gerstenslager | ......... | B60B 27/02 |
| | | | | 301/108.4 |
| 2009/0241655 A1* | 10/2009 | Ingram | ............ | B60C 23/00318 |
| | | | | 73/146.3 |
| 2014/0261941 A1* | 9/2014 | Knapke | ............ | B60C 23/00354 |
| | | | | 152/417 |

\* cited by examiner

HUB COVERING FOR A TYRE FILLING DEVICE OF A VEHICLE

BACKGROUND OF THE INVENTION

The invention relates to a hub covering for a tire filling device of a vehicle for covering a vehicle wheel hub which is rotatable on a center line, wherein an air supply which is coupled to a steering knuckle arranged inside the wheel hub is connected at least indirectly via a rotary connection arranged on the hub covering to an air volume in a tire of a vehicle wheel. Furthermore, the invention relates to a tire filling device, comprising at least one hub covering according to the invention, and to an adapter for such a hub covering.

In order to ensure that a vehicle tire air pressure is always sufficient, on-board tire filling systems are known which monitor the air pressure in the vehicle tire and replace a missing air volume, optionally even during a journey. For this purpose, onboard the vehicle there is an air compressor from which an air feed line leads to the respective tire. Since the tire rotates with the vehicle wheel, the pressure line has at least one movable interface, that is to say a rotatable, but sealed compressed air connection. This imposes high demands on sealing, which is also permanent.

EP 1 265 761 B1 discloses an air-filling system for a vehicle having at least one axle. At least one wheel provided with a pneumatic tire is arranged at each end of the axle. The system has an air supply, an air connection to a rotary connection between the air supply and the tires. Furthermore, the system has a pressure booster pump with an inlet and an outlet for boosting the air pressure from the air supply to the tires, wherein the inlet is connected to the air supply and the outlet to the rotary connection and to the tires. The pressure booster pump is configured to increase the air pressure of the air supply.

The invention is based on the object of proposing an alternative hub covering for a tire filling device of a vehicle, which provides a permanently rotatable interface for the pressure line of the air supply.

SUMMARY OF THE INVENTION

The object is achieved by a hub covering for a tire filling device of a vehicle for covering a vehicle wheel hub which is rotatable on a center line, wherein an air supply which is coupled to a steering knuckle arranged inside the wheel hub is connected at least indirectly via a rotary connection arranged on the hub covering to an air volume in a tire of a vehicle wheel, characterized in that the rotary connection comprises an adapter which is arranged in an axially secured and rotatable manner on the hub covering and accommodates a rotary transmitter for producing a compressed air connection to the tire of the vehicle wheel; a tire filling device comprising at least one hub covering as claimed; and an adapter for a rotary connection of a hub covering as claimed, wherein the adapter is designed to be arranged in an axially secured and rotatable manner on the hub covering and to accommodate a rotary transmitter for producing a compressed air connection to a tire of a vehicle wheel.

Preferred embodiments are indicated in the dependent claims.

A hub covering according to the invention for a tire filling device of a vehicle is provided for covering a vehicle wheel hub which is rotatable on a center line, wherein an air supply which is coupled to a steering knuckle arranged inside the wheel hub is connected at least indirectly via a rotary connection arranged on the hub covering to an air volume in a tire of a vehicle wheel. The rotary connection comprises an adapter which is arranged in an axially secured and rotatable manner on the hub covering and which accommodates a rotary transmitter for producing a compressed air connection to the tire of the vehicle wheel. The rotary transmitter is preferably designed as a rigid, compressed-air-conducting angle piece. The angle piece is comprised of an axial limb arranged on the center line and at least one further limb arranged transversely with respect to the center line.

The hub covering is part of a tire filling device for a vehicle that makes use of the advantage of an on-board air compressor by the monitoring and optionally the supplying of air pressure in the tire of the respective vehicle wheel always being possible, even during a journey.

So that the rotary transmitter, which is designed as an angle piece, together with the further components of the rotary connection is always oriented in the direction of a ventilation valve of the tire, there is a rotatable and at the same time tight connection between the hub covering and the adapter of the rotary connection.

The rotary transmitter is designed as a rigid, compressed-air-conducting angle piece comprised of an axial limb arranged on the center line and at least one limb arranged transversely with respect to the center line.

For accommodating the rotary transmitter for conjoint rotation, the adapter can be provided with an internal thread into which an external thread formed on the axial limb of the rotary transmitter is firmly screwed. Each rotation of the adapter therefore leads to the rotary transmitter rotating at the same time Preferably, the rotary transmitter has a tubular line rod which leads out of the axial limb and is designed to conduct compressed air from the steering knuckle to the rotary transmitter.

Furthermore, it is proposed that the adapter has at least one flow connection which leads from its inner side facing the wheel hub to its end side facing away from the wheel hub. In the event of a leakage in the air supply of the tire filling device, the pressure is equalized via the flow connection. Part of the flow connection can be bores. For example, three bores are formed on the adapter.

A groove which is arranged around the center line and which accommodates a radial shaft sealing ring forms part of this flow connection. The groove is preferably formed in the end side of the adapter.

An elastic pressure-equalizing element is preferably arranged between the rotary transmitter and the adapter. The pressure-equalizing element comes to bear against a first shoulder of the adapter, wherein the first shoulder of the adapter limits both an axial and a radial movability of the pressure-equalizing element and therefore securely keeps the latter in its position. The pressure-equalizing element acts substantially like a membrane, with, if the air pressure within the air supply exceeds a limit value, the pressure being equalized via the membrane in order to protect the components of the tire filling device.

A protective cap for covering the pressure-equalizing element is preferably provided, wherein the protective cap comes to bear axially against the adapter. The protective cap is advantageously arranged axially between the rotary transmitter and the adapter and comes to bear against a second shoulder of the adapter. It is ensured by the protective cap that the pressure-equalizing element and in particular the hub internal space is protected against external influences. In addition, it is possible to axially pretension the pressure-equalizing element by means of the protective cap. In other words, the space in which the pressure-equalizing element is arranged is restricted by the adapter and the protective cap.

The outside of the end side of the adapter preferably has the encircling groove for accommodating the radial shaft sealing ring. This groove is spatially connected to the at least one bore. In the event of a leakage of the air supply, a positive pressure occurs in the hub interior space. If the positive pressure exceeds a limit value, pressure is equalized primarily via the radial shaft sealing ring and secondarily via the pressure-equalizing element. At the same time, the radial shaft sealing ring and the pressure-equalizing element protect the hub interior space against the penetration of dirt and/or moisture.

According to a preferred exemplary embodiment, the adapter has a tubular portion and a flange-shaped portion, wherein the tubular portion is at least partially passed through an opening in the hub covering and the flange-shaped portion comes to bear axially against the hub covering from outside the vehicle.

A further encircling groove which is provided for receiving a snap ring is preferably formed on the outer circumference of the tubular portion of the adapter. The adapter is therefore axially secured by means of its flange-shaped portion and the snap ring relative to the hub covering, wherein any desired rotation of the adapter together with the rotary transmitter relative to the hub covering is possible for the purpose of orienting the rotary transmitter. The snap ring is designed in particular as a round wire snap ring.

An encircling recess for receiving a sealing ring is preferably formed on an end surface of the flange-shaped portion of the adapter, this end surface facing the wheel hub. Consequently, the tightness of the hub interior space in relation to the external atmosphere is ensured by the sealing ring, wherein the one sealing surface is formed on the adapter and the mating sealing surface corresponding thereto is formed on the hub covering. The mating sealing surface is preferably the end surface of the hub covering on the outer side of the vehicle. In addition, the hub interior space is protected by the sealing ring against undesirable ingress of moisture and dirt.

The rotary transmitter preferably has an axial portion or limb and at least one radial portion or limb. The rotary transmitter can therefore be designed, for example, as an angle piece with a single radial limb or as a T piece with two preferably opposite radial limbs.

The adapter can have a tool-specific outer contour or a key surface which makes it possible to hold the adapter for conjoint rotation during the screwing in of the rotary transmitter on the adapter by means of a tool, in particular a wrench.

The adapter can be of multi-part design. It is thus conceivable for the center of the adapter to have a metallic sleeve or a sleeve formed from plastic with an internal thread into which the rotary transmitter can be screwed. The sleeve is insert-molded from a plastic in order to form the adapter. Owing to the higher mechanical demands, the sleeve has a greater strength than the rest of the body of the adapter.

Alternatively, the adapter can also be formed in one piece from a plastic, with the adapter merely having an axial bore or passage opening. The external thread of the rotary transmitter then digs into the inner circumferential surface of the passage opening as the rotary transmitter is being screwed in on the adapter. The deeper the rotary transmitter is screwed into the adapter, the greater is accordingly the tightness between the adapter and the rotary transmitter.

At its wheel-hub end, the rotary transmitter can have a line rod in the form of a small tube which is designed to connect the air supply from the steering knuckle to the rotary transmitter. In other words, the line rod is arranged between the axial portion of the rotary transmitter and the steering knuckle, with the line rod preferably being introduced axially into a receiving piece on the steering knuckle in a sealing manner.

The hub covering preferably has an internal thread which is formed in a corresponding manner to an external thread on the wheel hub. In a manner corresponding thereto, a corresponding external thread is formed on the wheel hub, and therefore the hub covering is fastenable to the wheel hub via a screw thread.

A sealing ring is preferably arranged between the wheel hub and the hub covering, as a result of which the hub interior space is sealed in relation to the external atmosphere, in particular in respect of protecting against an ingress of moisture and dirt into the hub interior space.

The invention furthermore relates to a tire filling device for a vehicle, wherein the vehicle preferably comprises at least one axle which has, at each end, a wheel hub on which at least one wheel with a respective tire filled with compressed air is arranged. The respective wheel hub is designed in such a manner that the hub covering according to the invention is connected in a pressure-tight manner thereto. The tire filling device has an air supply which is connected to the air volume of the tire via the hub covering and the rotary connection arranged thereon.

In addition, the invention relates to an adapter for a rotary connection of a hub covering according to the invention, wherein the adapter is designed to be arranged in an axially secured and rotatable manner on the hub covering and to accommodate a rotary transmitter for producing a compressed air connection to a tire of a vehicle wheel.

BRIEF DESCRIPTION OF THE DRAWINGS

The invention is explained in more detail below using two preferred exemplary embodiments with reference to the drawings and the details reproduced therein. In the drawings.

DESCRIPTION OF PREFERRED EMBODIMENTS

The hub covering described here is particularly suitable for utility vehicles and in particular non-driven axles of utility vehicles and utility vehicle trailers.

Figure 1:
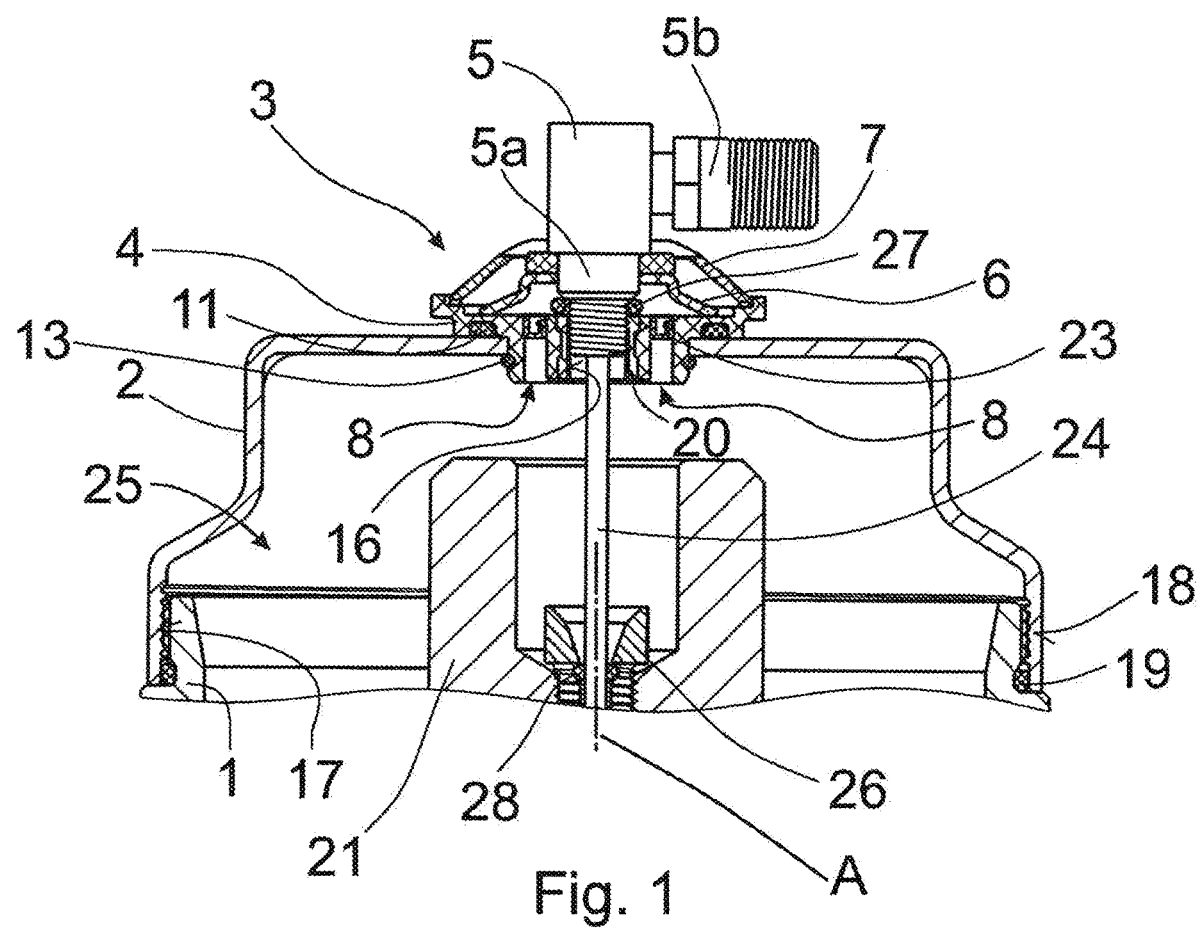
FIG. 1 shows a schematic sectional illustration of a tire filling device according to the invention according to a first embodiment.
Figure 2:
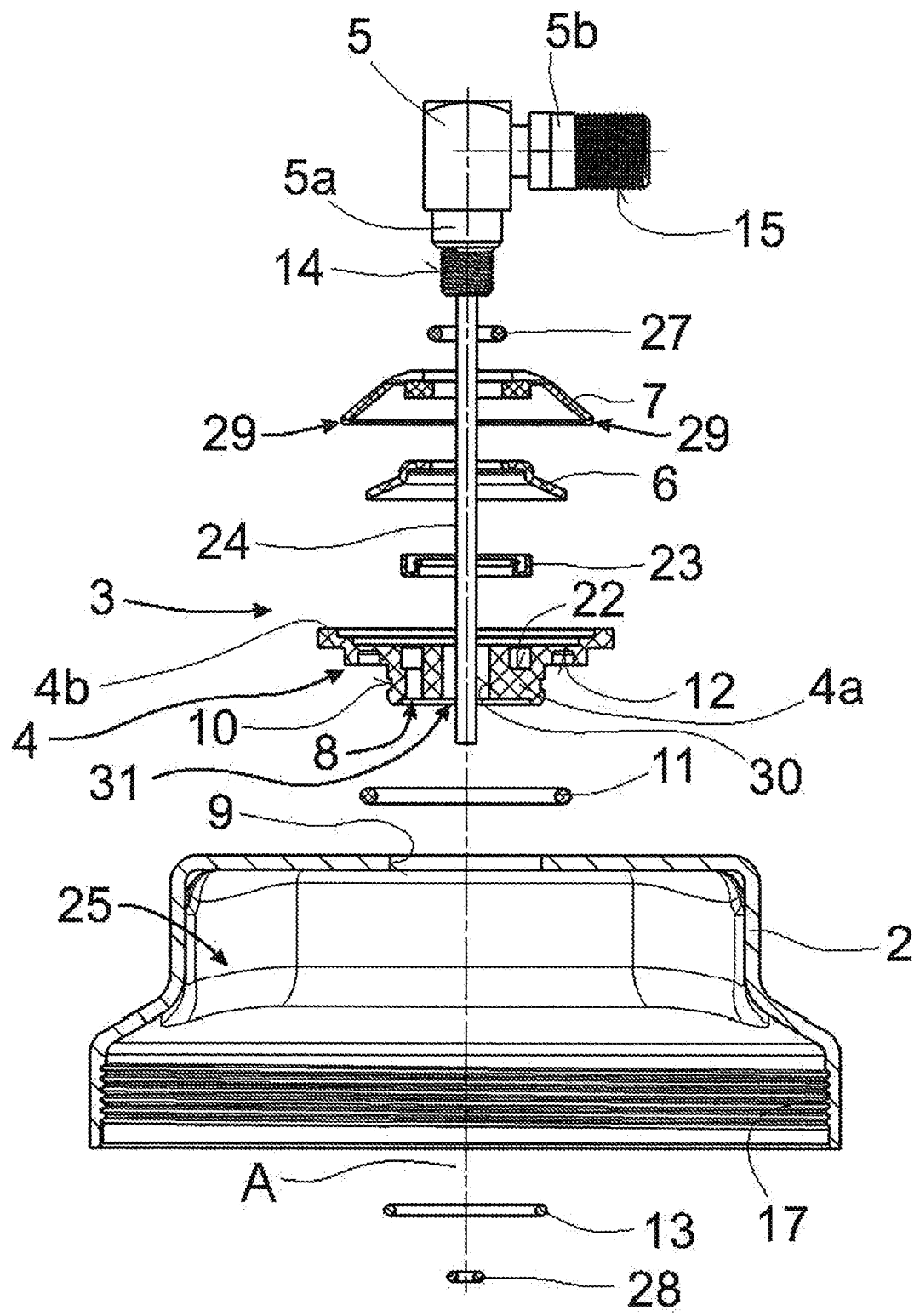
FIG. 2 shows an in an exploded illustration, reproduced in longitudinal section, of the separated elements of the tire filling device according to a second embodiment.

According to FIG. 1 and FIG. 2, the hub covering 2 is provided for a tire filling device, not shown specifically here, of a vehicle. According to FIG. 1, the hub covering 2 covers a vehicle wheel hub 1, which bears the respective vehicle wheel, to the outside of the vehicle. During the driving mode, the hub covering 2 therefore rotates together with the wheel hub 1 on the center line A. For this purpose, the wheel hub 1 is rotationally mounted on a steering knuckle 21 of the vehicle axle via at least one rolling bearing.

The vehicle axle steering knuckle 21, which is arranged on the center line A, is coupled to an air supply, not illustrated here, by, for example, the interior of the axle or of the steering knuckle 21 being designed as a cavity which is connected, or is connectable in a valve-controlled manner, to a compressed air source. The air supply is designed to supply at least one tire of the respective vehicle wheel with compressed air.

The hub covering 2 is of cap-like configuration for its connection to the wheel hub 1 and has an internal thread 17 which is formed in a corresponding manner to an external thread 18 of the wheel hub 1 such that there is a pressure-tight screw connection in the mounted state between the hub covering 2 and the wheel hub 1. In order to protect the hub interior space 25 and especially the rolling bearing against moisture and/or dirt from the external atmosphere, a sealing ring 19 is furthermore provided which is arranged between the wheel hub 1 and the hub covering 2.

The vehicle wheel tire, not shown here, is supplied with air via a rotary connection 3 which is arranged on the cap-like hub covering 2 and connects the air supply of the tire filling device to the air volume in the tire.

The rotary connection 3 is situated in an extension of the center line A of the vehicle axle. The rotary connection 3 comprises an adapter 4 which is arranged in an axially secured and rotatable manner on the hub covering 2. In order to form the compressed air connection with the tire, the adapter 4 accommodates a rotary transmitter 5.

The rotary transmitter 5 is designed as a rigid, compressed-air-conducting angle piece. The angle piece is comprised of a limb 5a arranged on the center line A and a further limb 5b arranged transversely with respect to the center line A. At the end of the limb 5a arranged on the center line A, the rotary transmitter 5 has an external thread 14 in order to firmly screw the rotary transmitter 5 to the adapter 4 with the interposition of a sealing ring 27. Furthermore, the rotary transmitter 5 also has an external thread 15 on the further limb 5b in order to permit a screw connection to further air supply elements, not illustrated here, for example to a pressure tube leading to the tire.

The rotary transmitter 5 is therefore designed as an angle piece, comprising the axial portion or limb 5a and the radial portion or radial limb 5b at a 90° angle thereto. The axial portion or limb 5a, since it extends on the center line A, is arranged coaxially with respect to the hub covering 2 and the adapter 4. Alternatively, the rotary transmitter 5 can also have two or more of the radial limbs 5b.

A line rod 24 in the form of a small tube is fixed to the axial portion or limb 5a of the rotary transmitter 5. The tubular line rod 24 is introduced in a sealed manner into a receiving piece 26 on the steering knuckle 21 for the purpose of connecting the rotary transmitter 5 in terms of flow to the air supply integrated in the steering knuckle 21. The air supply is essentially sealed by a sealing ring 28 between the receiving piece 26 and the tubular line rod 24. The receiving piece 26 is screwed into the steering knuckle 21 and is therefore nonrotatable with respect to the steering knuckle 21.

During the driving mode, i.e. when the wheel hub 1 rotates and, under some circumstances, rotates very rapidly, there are two possibilities. Either, according to the exemplary embodiments which are illustrated, the line rod 24 is fastened, at its end positioned on the outside of the vehicle, nonrotatably in the limb 5a of the angle piece. In this case, the line rod 24 therefore rotates together with the hub covering 2 such that the end of the line rod positioned on the inside of the vehicle rotates relative to the receiving piece 26, with this relative rotation taking place with sealing provided by the sealing ring 28. Or else the line rod 24, at its end positioned on the inside of the vehicle, is fastened nonrotatably in the receiving piece 26. In this case, the hub covering 2 rotates relative to the stationary line rod 24, and therefore, in this case, a rotary seal has to be realized in the limb 5a of the angle piece.

The adapter 4 is passed with a tubular portion 4a, which is arranged on the center line A, through a central opening 9 in the hub covering 2. An encircling groove 10 is formed on the portion 4a, this groove receiving a snap ring 13, which is in the form of a securing ring, for axially securing the adapter 4 in relation to the hub covering 2.

Although the adapter 4 is axially secured relative to the hub covering 2 by the snap ring 13, the adapter 4 remains rotatable as desired in relation to the hub covering 2. This rotatability is important so that the rotary transmitter 5, which is firmly screwed to the adapter 4, can be oriented together with the further components of the rotary connection, in particular in the direction of the ventilation valve of the tire.

This orientation is facilitated by the adapter 4 being provided with a key surface, for example a polygon, on a flange-shaped portion 4b which is widened in relation to the tubular portion 4a. For example, the entire circumferential edge of the flange-shaped portion 4b can be configured as a polygon. A tool can be attached to the polygon in order thereby to rotate the adapter 4, and therefore at the same time the angle piece, in a certain direction which is then permanently retained, inter alia, by the friction because of the snap ring 13.

The polygon is furthermore helpful for preventing the adapter from rotating at the same time as the thread 14 is being screwed into the internal thread 16 of the adapter 4.

The adapter 4 comes to bear with the flange-shaped portion 4b axially against the hub covering 2 from the outside of the vehicle, wherein an encircling recess 12 is formed on the flange-shaped portion 4b on the wheel-hub side in order to receive a sealing ring 11, for example an O ring. The sealing ring 11 is clamped axially between the outer side of the hub covering 2 and the adapter 4 and seals the hub interior space 25 to the outside of the vehicle.

On its end side facing the outside of the vehicle, the adapter 4 has a groove 22, which encircles the center line A, for receiving a radial shaft sealing ring 23. The radial shaft sealing ring 23 prevents moisture and/or dirt from being able to penetrate the hub interior space 25. Furthermore, the radial shaft sealing ring 23 permits an equalization of pressure if a positive pressure occurs in the hub interior space 25 as a result of a leakage of the air supply. The radial shaft sealing ring 23 is fixed in the groove 22 to an extent such that it cannot leave the latter.

An elastic pressure-equalizing element 6 which acts as a membrane is arranged between the rotary transmitter 5 and the adapter 4. The pressure-equalizing element 6 is of substantially funnel-shaped design and comes to bear axially both against the adapter 4 and against the rotary transmitter 5. The adapter 4 is designed in such a manner that the pressure-equalizing element 6 is secured radially thereon.

The pressure-equalizing element 6 is protected from external influences, such as moisture and dirt, by a protective cap 7 which is formed from plastic and, in order to cover the pressure-equalizing element 6, comes to bear axially against the adapter 4 and is secured likewise radially there. In other words, the protective cap 7 and the adapter 4 restrict a space in which the pressure-equalizing element 6 is accommodated. This space is in a flow connection 8 to the hub interior space 25. Part of this flow connection 8 are three bores formed on the adapter 4. However, there can also be fewer or more than three bores. The bores connect the hub interior space 25 to that groove 22 in which the radial shaft sealing ring 23 sits. The groove 22 is therefore also part of the flow connection 8 by means of which the pressure can be equalized.

So that excess air in the event of positive pressure can escape from the hub interior space 25, a plurality of slot-shaped and radially running outlet openings 29 are provided on the protective cap 7. The outlet openings 29 are shown in FIG. 2. For perspective reasons, only two of the bores 8 are illustrated in FIG. 1, with only one bore 8 being shown in FIG. 2. If a positive pressure occurs in the hub interior space 25, the pressure is equalized via the radial shaft sealing ring 23 and the pressure-equalizing element 6 by the excess air being output into the atmosphere via the outlet openings 29.

The two embodiments according to FIG. 1 and FIG. 2 differ in that the adapter 4 according to FIG. 1 is formed in two parts and according to FIG. 2 in one part.

According to FIG. 1, a first part of the adapter 4 is comprised of the tubular portion 4a and the flange-shaped portion 4b. This first part of the adapter 4 is provided in its center on the center line A with an axially continuous opening which is provided for receiving the second part of the adapter 4. The second part of the two-part adapter 4 is a sleeve 20 which is designed to axially accommodate the rotary transmitter 5.

The sleeve 20 of the adapter 4 has an internal thread 16 which is formed in a corresponding manner to the external thread 14 at a wheel-hub end of the rotary transmitter 5. The sleeve 20 can be formed, for example, from a metal of a higher strength in order to be able to absorb the mechanical forces when the rotary transmitter 5 is screwed into the sleeve 20. In a production process, the sleeve 20 can be insert-molded from a plastic for forming the two-part adapter 4, as a result of which the metallic sleeve 20 is embedded in the plastic of which the adapter 4 is otherwise composed.

On its end side facing the outside of the vehicle, the sleeve 20 is provided with a preferably somewhat recessed annular surface against which the sealing ring 27 lies in a sealed manner.

By contrast, the adapter according to FIG. 2 is formed in one piece from a plastic and has only one axial through opening 31 for receiving the axial portion 5a of the rotary transmitter 5. In other words, the adapter 4 initially does not have an internal thread. However, the external thread 14 of the rotary transmitter 5, as it is being screwed into an inner circumferential surface 30 of the passage opening 31, digs into the plastics material, as a result of which a thread is as it were cut for the first time and an additional sealing effect is achieved.

LIST OF REFERENCE CHARACTERS

1 Wheel hub
2 Hub covering
3 Rotary connection
4 Adapter
4a Tubular portion of the adapter
4b Flange-shaped portion of the adapter
5 Rotary transmitter
5a Limb of the rotary transmitter
5b Limb of the rotary transmitter
6 Pressure-equalizing element
7 Protective cap
8 Flow connection, bore
9 Opening
10 Groove
11 Sealing ring
12 Recess
13 Snap ring
14 External thread at the wheel-hub end of the rotary transmitter
15 External thread at the tire end of the rotary transmitter
16 Internal thread
17 Internal thread on the hub covering
18 External thread on the wheel hub
19 Sealing ring
20 Sleeve
21 Steering knuckle
22 Groove
23 Radial shaft sealing ring
24 Tubular line rod
25 Hub interior space
26 Receiving piece
27 Sealing ring
28 Sealing ring
29 Outlet opening
30 Inner circumferential surface
31 Passage opening
A Center line

What is claimed is:

1. A hub covering for a tire filling device of a vehicle for covering a vehicle wheel hub (1) rotatable on a center line, wherein an air supply coupled to a steering knuckle (21) arranged inside the vehicle wheel hub (1) is connected at least indirectly via a rotary connection (3) arranged on the hub covering (2) to an air volume in a tire of a vehicle wheel, wherein the rotary connection (3) comprises an adapter (4) arranged in an axially secured and rotatable manner on the hub covering (2) and accommodating a rotary transmitter (5) for producing a compressed air connection to the tire of the vehicle wheel, wherein the adapter (4) comprises a flow connection (8) extending between an inner side of the adapter (4) facing the vehicle wheel hub (1) and an end side of the adapter (4) facing away from the vehicle wheel hub (1), wherein the flow connection (8) of the adapter (4) comprises a first encircling groove (22), wherein the first encircling groove (22) is formed in the end side of the adapter (4) and opens axially in a direction away from the vehicle wheel hub (1), and wherein the first encircling groove (22) encircles the center line (A) and accommodates a radial shaft sealing ring (23).

2. The hub covering as claimed in claim 1, wherein the rotary transmitter (5) is a rigid, compressed-air-conducting angle piece comprised of an axial limb (5a) arranged on the center line (A) and at least one limb (5b) arranged transversely with respect to the center line (A).

3. The hub covering as claimed in claim 2, wherein, for accommodating the rotary transmitter (5) for conjoint rotation, the adapter (4) comprises an internal thread (16, 30) into which an external thread (14) formed on the axial limb (5a) is firmly screwed.

4. The hub covering as claimed in claim 1, wherein the rotary transmitter (5) has a tubular line rod (24) leading out of the axial limb (5a) and configured to conduct compressed air from the steering knuckle (21) to the rotary transmitter (5).

5. The hub covering as claimed in claim 1, further comprising an elastic pressure-equalizing element (6) arranged between the rotary transmitter (5) and the adapter (4).

6. The hub covering as claimed in claim 5, further comprising a protective cap (7) configured to cover the pressure-equalizing element (6), wherein the protective cap (7) bears axially against the adapter (4).

7. The hub covering as claimed in claim 1, wherein the adapter (4) comprises a tubular portion (4a) and a flange-shaped portion (4b), wherein the tubular portion (4a) extends at least partially through an opening (9) in the hub covering (2) and the flange-shaped portion (4b) bears axially against the hub covering (2) from outside the vehicle.

8. The hub covering as claimed in claim 7, further comprising a second encircling groove (10) formed on an outer circumference of the tubular portion (4a) of the adapter (4), wherein the second encircling groove (10) is configured to receive a snap ring (13).

9. The hub covering as claimed in claim 7, further comprising an encircling recess (12) formed on an end surface of the flange-shaped portion (4b) of the adapter (4), wherein the end surface faces the wheel hub (1), and wherein the encircling recess (12) is configured to receive a sealing ring (11).

10. The hub covering as claimed in claim 1, wherein the hub covering (2) comprises an internal thread (17) formed to correspond to an external thread (18) of the vehicle wheel hub (1).

11. The hub covering as claimed in claim 1, further comprising a sealing ring (19) arranged between the vehicle wheel hub (1) and the hub covering (2).

12. The hub covering as claimed in claim 1, wherein the adapter (4) comprises a key surface for attaching a tool.

13. The hub covering as claimed in claim 12, wherein the key surface is in the form of a polygon.

14. The tire filling device for the vehicle, comprising at least one hub covering (2) as claimed in claim 1.

15. The adapter (4) for the rotary connection of the hub covering as claimed in claim 1, wherein the adapter (4) is configured to be arranged in an axially secured and rotatable manner on the hub covering (2) and to accommodate the rotary transmitter (5) for producing a compressed air connection to the tire of the vehicle wheel.

* * * * *